United States Patent
von Taschitzki

[11] 3,802,395
[45] Apr. 9, 1974

[54] AUTOMATIC WATER SUPPLYING DEVICE PARTICULARLY FOR VERY YOUNG ANIMALS

[75] Inventor: Rainer von Taschitzki, Cologne, Germany

[73] Assignee: Aratowerk Walter V. Taschitzki, Cologne, Neumarer Manuspfad, Germany

[22] Filed: Dec. 21, 1972

[21] Appl. No.: 317,191

[30] Foreign Application Priority Data
Jan. 20, 1972 Germany.............................. 7202019

[52] U.S. Cl. .................................................. 119/75
[51] Int. Cl............................................ A01k 7/00
[58] Field of Search............................ 119/72.5, 75

[56] References Cited
UNITED STATES PATENTS

| | | | |
|---|---|---|---|
| 1,276,813 | 8/1918 | Rassmann............................ | 119/75 |
| 1,283,274 | 10/1918 | Nottingham............................ | 119/75 |
| 1,296,586 | 3/1919 | Louden................................. | 119/75 |
| 1,841,866 | 1/1932 | Wilson.................................. | 119/75 |
| 3,044,447 | 7/1962 | Lenz..................................... | 119/75 |
| 3,515,099 | 6/1970 | Clark et al............................. | 119/75 |

Primary Examiner—Russell R. Kinsey
Assistant Examiner—J. A. Oliff
Attorney, Agent, or Firm—Diller, Brown, Ramik & Wight

[57] ABSTRACT

This disclosure relates to an automatic water supplying device for animals, particularly very young animals such as suckling pigs, lambs, etc., wherein a drinking vessel or bowl is tiltably or pivotally mounted in a housing and a valve for supplying water to the drinking bowl is controlled by changes in the quantity of the water in the bowl.

11 Claims, 7 Drawing Figures

AUTOMATIC WATER SUPPLYING DEVICE PARTICULARLY FOR VERY YOUNG ANIMALS

In a conventional automatic watering system a valve is provided for refilling the drinking vessel with the valve being opened to permit the introduction of water into the bowl by an animal when it operates a lever projecting into the vessel. However, this system is not suitable for supplying water to very young animals since they have not the maturity to recognize and/or learn that they themselves must operate the lever or like mechanisms to obtain water.

In another conventional water supply system the valve operates automatically through a float arrangement and as such the water supply is independent of the actions of the animals involved. In this case the float requires a substantial depth of water in order to become effective, but the depth of the water contradicts the hygienic requirement of exposing as little water as possible to contamination. Even though the float system may be accommodated in a separate supply chamber, it is not possible to avoid dirt and food particles filtering back along the supply conduit into the supply chamber. In addition, the separate supply chamber is disadvantageous because it becomes more progressively difficult to clean as it is progressively better protected from the environment, i.e., dirt and similar contaminants. Since it is absolutely impossible to separate the drinking bowl from the valve system for cleaning purposes the hygienic problems are not solved by the latter-described system.

It is also conventional for a drinking vessel to be tiltably mounted in a housing so that it can act in a controlled manner upon the water supply valve by changes in water depth with the valve being closed as soon as the bowl is full and reopening after there is any decrease in its contents. However, prior to the present invention this system did not successfully apply to the watering of young animals because in known prior art structures of this type the operating mechanism is simply too sluggish and becomes more so with age, contamination, calcification, etc. Since a water supply system for young animals should, because of hygienic reasons, supply only a few cubic centimeters of water at a time to maintain minimum depth the supply valve must respond with sensitivity and the drinking bowl must be mounted such that it moves readily and be quickly removed from its housing for cleaning purposes. Because of various deficiencies in construction in conventional water supply systems most have not operated satisfactorily, particularly in those wherein the drinking bowl is counterbalanced by counter-weights or springs which are united to the drinking bowl simply because though it is proper engineering to have the balancing force acting only on the drinking vessel such should not occur by a connection thereto. It is equally undesirable to pre-load the valve stem with a biasing or counterbalancing force since it simply will not operate with sufficient sensitivity to obtain the objective desired. Almost useless are prior art constructions in which the valves remain closed only as long as the weight of the filled drinking bowl acts upon the valve because for purposes of cleaning the drinking bowl the water supply must be disconnected by means of, in most cases, the provision of an additional shut-off valve which obviously increases system costs.

A primary object of the present invention is to provide an automatic water supply device for very young animals, such as suckling pigs, lambs, or the like, with a tiltably or pivotally mounted drinking bowl and an associated water supply valve which is controllable by changes in the depth of the water in the drinking bowl, the water supply device being of an extremely simple design which operates with sensitivity and is capable of rapid removal, cleansing, disinfection, etc. The automatic supply device includes a drinking bowl tiltably mounted in a housing and having an inlet water control valve which is controlled by changes in the water depth of the drinking bowl with the construction being particularly characterized by a counterbalancing spring in the housing adjacent the water inlet valve which acts on a terminal end of the drinking bowl such that the equilibrium position of the drinking bowl can be accurately controlled as desired to maintain sensitivity of operation. The spring is connected at one end to the housing by threaded adjusting means for increasing or decreasing the biasing force thereof and at opposite end bears upon a bearing received in a cup-shaped recess of the bowl thus permitting removal of the bowl in the absence of tools or mechanical disassembly of components of any type.

In accordance with the present automatic water supply device the valve is closed both when engaged by the drinking bowl when filled to a prescribed and desired level and also when the drinking bowl is removed for cleaning and other purposes. When the valve is opened to release water it is engaged only by the drinking bowl itself.

The present novel automatic water supply device enables a cooperative sensitive operation due to the association of the drinking bowl and the water supply valve to thereby not only provide accurate automatic control of water flow and water depth but hygienic requirements of easy access for cleansing and the like are maintained at the highest degree possible. Moreover, the structure is such that the drinking bowl is not positively connected to the housing at any point and can be removed at any time simply by grasping and lifting in the absence of using tools and/or removing nonexistent mechanical connections of any type.

Of particular importance is the fact that the inlet water control valve includes an operating stem which operates through the bowl and upon removal of the bowl the stem and its associated valve seat drop automatically into a closed position thereby precluding the necessity of special shut-off valves as in conventional systems. Thus the valve will remain in its lower or closed position until the drinking bowl, which may have been cleaned, after removed, is once again replaced to lift the valve through the stem back into its operating or open position.

The desired point of equilibrium of the drinking bowl is established by the adjusting device heretofore described by an increase or decrease in the biasing force of a spring adjusted through a threaded element. The latter structure is advantageously designed externally of the valve and drinking bowl and thus balancing, equilibrium or trimming of the device can be readily achieved to determine and maintain the depth of water in the bowl which is considered desirable for the particular animals fed therefrom.

In further accordance with this invention the inlet water control valve engages the free arm of the drinking bowl at a point on the longitudinal axis of the drinking bowl while the housing is provided with two openings each on opposite sides of and offset from the longitudinal axis, either one of which can receive the water inlet control valve. This construction is particularly advantageous in the rearing of young animals because the associated animal cages often lie adjacent each other in a line enabling a large amount of material and set-up time to be saved if the watering device can be positioned between two adjacent cages in a recess of a dividing wall therebetween such that animals of both cages can use the same drinking device. By thus offsetting the apertures which receive the valves the inlet water pipe can be fitted to the inlet water control valve offset from the dividing wall between the cages and thereby preludes the problem present in known structures. This, of course, presents the problem of canting diagonally due to the offcenter arrangement of the valve, but this problem is resolved by the provision of hold-down means which is disposed in the unoccupied valve aperture which precludes the drinking bowl to be tilted diagonally by animals in either adjacent cage.

Turning to specifics of the invention, the valve body carried by the stem has top and bottom faces which operate in conjunction with sealing members, either in the form of valve seats or seal supports, thus providing the advantage of a particularly sensitive mode of operation particularly when the valve is released rapidly as the drinking bowl is lifted and removed from the automatic water supply device.

The invention further provides the provision of a valve body which is not arranged directly inside a valve casing but rather in a special inflow nozzle which is fitted with a portion extending through a bore in an end wall of the valve casing and is secured at its opposite end by an outflow nozzle with a sealing ring being located between the inflow nozzle and the valve casing at a point whereat the nozzle passes through the valve casing. The provision of this special inflow nozzle is advantageous both from the standpoint of removing blockage due to foreign substances by rapidly removing the inflow nozzle for cleaning when otherwise the entire valve would necessarily have to be dismantled and also because, depending upon prevailing water pressure, the size of the inflow opening of the valve can be altered by inflow nozzles of various sized bores. Furthermore, in order to provide the valve stem with its required axial guidance the bore in which it moves is designed as an elongated guide cylinder with at least one groove running longitudinally or axially on the cylinder periphery through which the water supply can flow from a chamber housing the valve body.

With the above and other objects in view that will hereinafter appear, the nature of the invention will be more clearly understood by reference to the following detailed description, the appended claimed subject matter, and the several views illustrated in the accompanying drawings.

Figure 1:
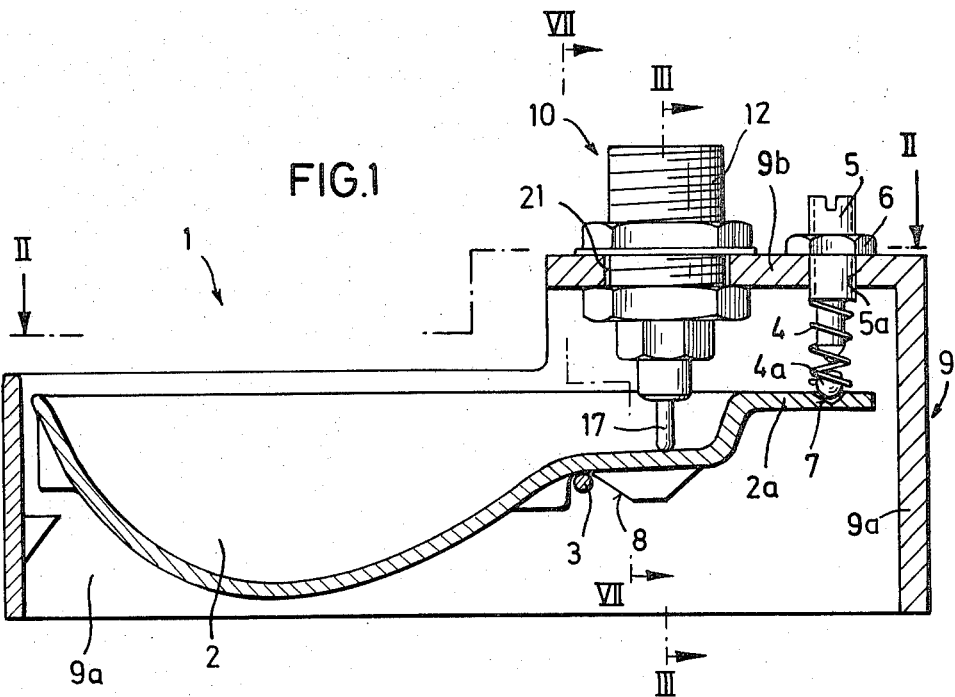
FIG. 1 is a longitudinal sectional view taken through the automatic water supply device of this invention, and illustrates the manner in which an inlet water control valve is operated by the position of a drinking bowl whose equilibrium can be adjusted as desired.
Figure 2:
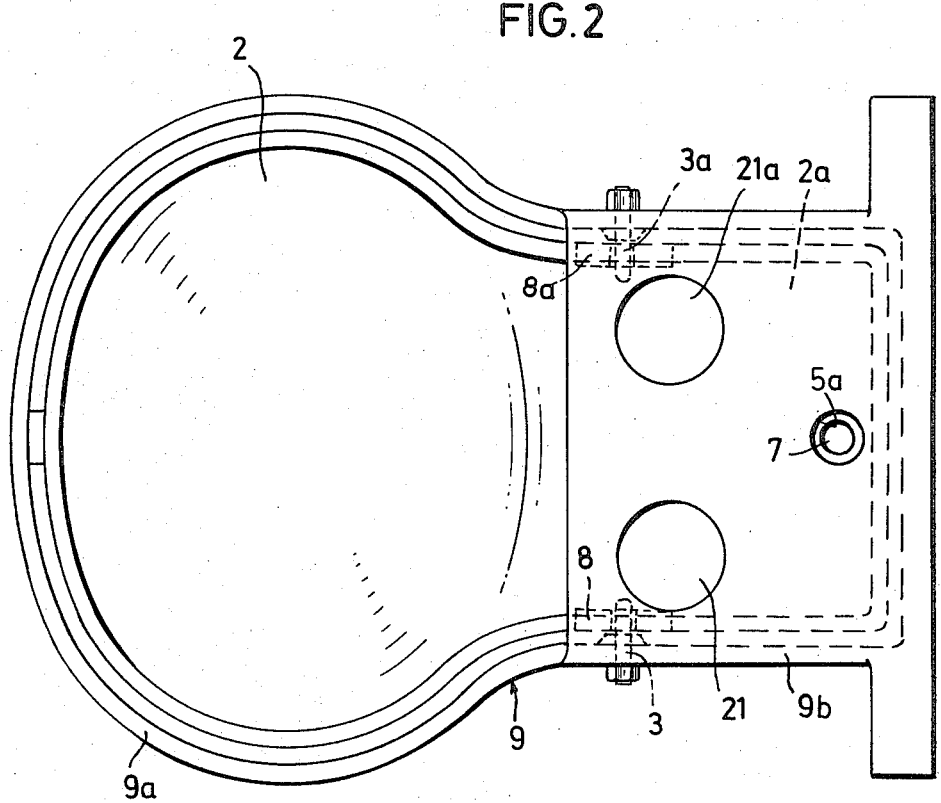
FIG. 2 is a sectional view taken generally along the line II—II of FIG. 1, and illustrates a pair of openings either of which may receive an inlet water control valve with the equilibrium adjusting means being disposed along the longitudinal center line of the drinking bowl.

An automatic water supply device constructed in accordance with this invention is generally designated by the reference numeral 1 and includes a drinking vessel or bowl 2 of a trough-like configuration having a terminal end or arm 2a projecting outwardly from one longitudinal end of the bowl 2 which, as viewed in FIGS. 1 and 2, is the right-hand end thereof. A housing or casing 9 has a peripheral wall 9a extending completely around the periphery of the drinking bowl and includes an upper portion 9b overhanging the arm 2a. The drinking bowl 2 is tiltably or pivotally mounted in a horizontal plane about a horizontal axis by bearing pins 3, 3a (FIG. 2). A compression spring 4 functions as a counter-balance between the overhanging portion 9b of the housing 9 and the arm 2a of the bowl 2. The spring 4 is secured at one end (unnumbered) to an adjusting screw 5 threaded into a threaded bore 5a of the overhanging portion 9b with any final adjusted position being locked upon the tightening of a nut 6. The lower free end (unnumbered) of the spring 4 embraces a ball 4a received therein or attached thereto for seating engagement in an upwardly opening recess 7 of the arm 2a. Thus the biasing force of the spring 4 normally urges the bowl 2 in a clockwise direction, as viewed in FIG. 1, about the pins 3, 3a which are straddled by downwardly opening cup-shaped bearing parts 8, 8a (FIGS. 1 and 2) of the side wall 9a of the casing 9.

A water inlet control valve 10 is operated by the tiltable drinking bowl 2 and is securely mounted in the overhanging portion 9b of the casing 9 in the manner readily apparent in FIGS. 1, 3, 5 and 6. The valve 10 includes a valve housing 11 provided with an external thread 12 at its upper end for connection to a water supply pipe. Within the valve housing 11 is provided an inflow nozzle 13 having an inlet opening 14 at its upper end extending through an aperture (unnumbered) in the upper end of the housing 11. A seal 15 is positioned between the valve housing 11 and the inflow nozzle 13 and may be, for example, a conventional O-ring seal. The inflow nozzle 13 is secured in the assembled position by an outlet nozzle 16 which is threaded into the valve housing 11. A valve or valve body 18 is axially slidably housed within the inflow nozzle 13 and is in the form of an elongated element having at least one but preferably a plurality of axial grooves 19 (FIG. 4) along its exterior running the length thereof. A stem 17 forms an integral extension of the valve body 18 and projects downwardly through a central bore or passage (unnumbered) of the outlet nozzle 16 with sufficient clearance to allow the passage of water therethrough. The elongated shape of the valve body 18 provides for the guiding of the stem 17 longitudinally along its bore (unnumbered) within the outlet nozzle 16. In the uppermost position of the valve body 18 (FIG. 3) the same closes off the inflow opening 14 through the intermediary of a seal 20a attached to the upper surface (unnumbered) of the valve body 18. In its lowermost position (FIG. 6) when the stem 17 of the valve body 18 is fully free of loading, as when the drinking bowl 2 has been removed from the casing 9, the lower surface of the valve body 18 contacts and seals against another O-ring seal 20 between a valve seat 18b of the valve body 18 and a surface 16a of the outflow nozzle 16. The valve 10 is, of course, secured to the overhanging portion 9b of the casing 9 in either of a pair of apertures 21, 21a, by an appropriate nut 21.

When the drinking bowl 2 is being used the same is necessarily filled with water to a predetermined depth which is regulated or trimmed depending upon various factors, such as water line pressure, by the adjustment of the pressure spring 4.

Figures 3, 4:
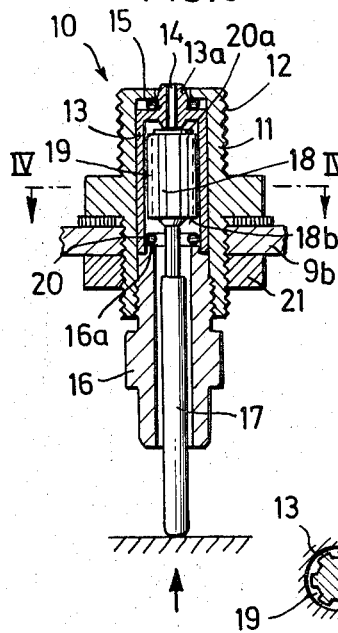
FIG. 3 is a sectional view taken generally along the line III—III of FIG. 1, and illustrates details of the inlet water control valve of this invention.
FIG. 4 is a cross-sectional view taken generally along line IV—IV of FIG. 3, and illustrates details of the valve stem bore or gate and particularly axial grooves in the stem for the passage of water therethrough.
Figure 5:
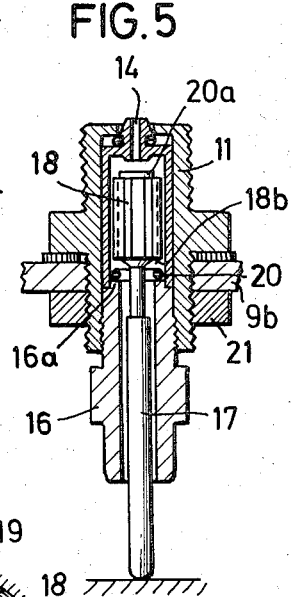
FIGS. 5 and 6 are cross-sectional views of the valve similar to FIG. 3, but each shows the valve body in a different position which is respectively opened and closed.
Figure 6:
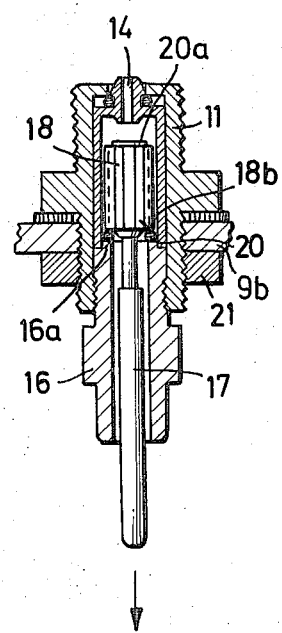

Preferably when the amount of water in the drinking bowl 2 reaches a predetermined point the load or force exerted upon the stem 17 of the valve 10 moves the same upwardly to the position shown in FIG. 3 causing the closing of the inlet opening 14 by the sealing block or seal 20a. As soon as the water in the drinking vessel has been reduced and/or exhausted the pressure spring 4 progressively presses or biases the arm 2a downwardly, as viewed in FIG. 1, which results in the clockwise pivoting of the drinking bowl 2 about the pins 3, 3a, as viewed in FIG. 1, whereupon the stem 17 descends. As the stem 17 descends (FIG. 5) the water supply automatically resumes upon the opening of the inlet opening 14 by the downward motion of the seal 20a (FIG. 5) whereupon the water passes through the housing past the seal 20 and along the longitudinal grooves 19 of the stem 17 into the drinking bowl 2 until the depth once again reaches its desired predetermined level resulting in upward movement of the stem 17 as the trough or drinking bowl 2 is pivoted counterclockwise as viewed in FIG. 1 about the pins 3, 3a. This results in the automatic closing of the valve once again by the seal 20a contacting and closing the opening 14 in the manner shown in FIG. 3.

In order to cleanse, disinfect and otherwise service the water supply device 1, the drinking bowl 2 is simply removed in the absence of any tools whatever from the casing 9 simply by lifting it upwardly outwardly and with a slight clockwise rotation as viewed in FIG. 1. As this is done the bearings 8, 8a automatically release themselves from the bearing pins 3, 3a and the ball 4a of the spring 4 is simply removed from the recess 7 yet is retained by the spring 4 due to its connection and/or insertion therein. Upon this movement the stem 17 of the valve 10 by virtue of being relieved of the load falls under its own weight (plus water pressure) to the position shown in FIG. 6 and the valve seat 18b of the valve body 18 becomes operative to seal against the O-ring 20 which, in turn, seals against the surface 16a to close the valve. Thus automatic closing of the water system is achieved in the absence of a separate shut-off valve. Once the drinking bowl 2 has been rinsed it can then be replaced just as quickly in the operating position within the casing 9.

Figure 7:
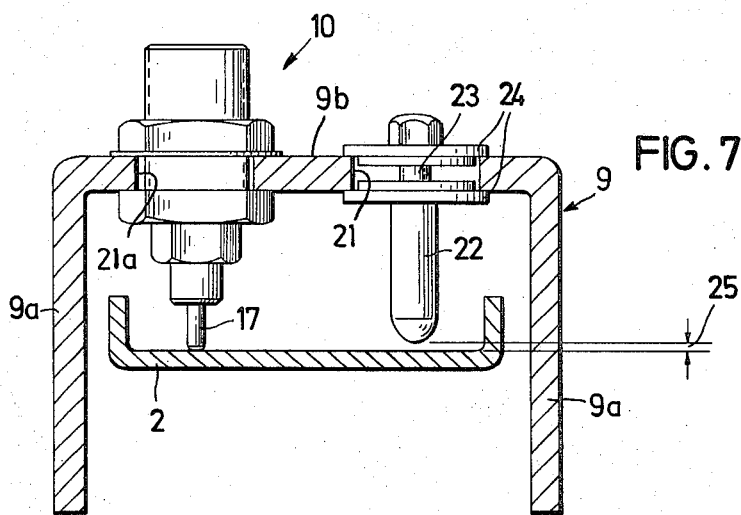
FIG. 7 is a cross-sectional view taken generally along line VII—VII of FIG. 1, and illustrates the manner in which the water supply device is provided with means for preventing the drinking bowl from canting or tipping diagonally when contacted by animals feeding from adjoining cages.

The purpose of the apertures or bores 21, 21a in the overhanging portion 9a of the casing 9 is to provide for the operative use of the drinking device 1 between adjacent cages having, as is customary, a dividing wall therebetween. The apertures 21, 21a are on opposite sides of a longitudinal center line of the drinking bowl 2, as may be best visualized in FIG. 2, although the bore 5a and the recess 7 lie with their axes upon the longitudinal center line. Assuming that the dividing wall is on the longitudinal axis of the drinking bowl 2 it will be evident that it is immaterial as to which of the apertures 21, 21a is provided with the valve 10 since the dividing wall provides no interference whatever for the water inlet pipe to either of the valves in the apertures 21, 21a. However, assuming the valve had been inserted in the aperture 21a (FIG. 7) in the absence of means to be described hereinafter there would be a tendency for the drinking bowl 2 to tip or cant, particularly if it were contacted by an animal drinking from the opposite sides or the side most closely adjacent to the aperture 21. In other words, there is a tendency in this construction for the drinking bowl 2 to tilt diagonally which is highly undesirable and accordingly hold-down means 22 is provided to increase reliability of operation of the drinking device 1. The hold-down means or device 22 is simply a stem 22 having an axially threaded bore which receives a bolt 23 with a pair of washers 24, 24 sandwiching therebetween the periphery of the overhanging portion 9b adjacent the aperture 21. The length of the stem 22 is slightly shorter than that of the stem 17, as indicated by the space identified by reference numeral 25 in FIG. 7, and this in effect produces some "play" which enables sufficient displacement of the valve stem 17 as the drinking bowl 2 is displaced during use and as the water level varies.

While preferred forms and arrangements of parts have been shown in illustrating the invention, it is to be clearly understood that various changes in details and arrangement of parts may be made without departing from the spirit and scope of this disclosure.

I claim:

1. An automatic water supply device for animals comprising a drinking bowl, means tiltably mounting said drinking bowl relative to its housing, valve means carried by said housing for regulating the flow of water therethrough into said drinking bowl, means biasing said drinking bowl in a direction for opening said valve means, means for adjusting the force of said biasing means whereby a desired position of equilibrium of the drinking bowl may be adjustably set, said adjusting means being an element in axial moving relationship to said housing having said biasing means sandwiched between the same and said bowl, said valve means includes a valve body, and means for moving said valve body to close said valve in response to movement imparted to said drinking bowl by said biasing means and/or the total removal of said drinking bowl from said housing.

2. The automatic water supply device as defined in claim 1 wherein said biasing means includes a terminal end remote from said adjusting means biasing against said drinking bowl, and means locating said terminal end relative to said drinking bowl.

3. The automatic water supply device as defined in claim 1 wherein said drinking bowl has a longitudinal axis, means mounting said valve means in offset relationship to and on one side of said longitudinal axis, and means in offset relationship to and on a second side of said longitudinal axis for limiting upward movement of an underlying portion of said drinking bowl to prevent undesirable tilting thereof.

4. The automatic water supply device as defined in claim 1 wherein said valve means includes a valve housing having inlet and outlet valve seats with said valve body therebetween, and said valve body is operative to close against either of said valve seats alternately or against neither.

5. The automatic water supply device as defined in claim 1 wherein said valve means includes a valve housing having inlet and outlet openings, said inlet opening is part of a separate element sandwiched between said valve housing and valve body, and sealing means between said valve housing adjacent an opening therein and said separate element is in surrounding relationship to said inlet opening for preventing leakage between said valve housing and said separate element.

6. The automatic water supply device as defined in claim 1 wherein said valve means includes a valve housing having inlet and outlet openings with said valve body therebetween, said valve body carries a stem passing through said outlet opening for operating said valve in response to drinking bowl motion, and said stem includes at least a single longitudinal groove for the passage of water therealong.

7. The automatic water supply device as defined in claim 2 wherein said locating means is a recess in said terminal end.

8. The automatic water supply device as defined in claim 2 wherein said biasing means is a coil spring and said terminal end carries a locating ball.

9. The automatic water supply device as defined in claim 2 wherein said drinking bowl has a longitudinal axis, means mounting said valve means in offset relationship to and on one side of said longitudinal axis, and means in offset relationship and on a second side of said longitudinal axis for limiting upward movement of an underlying portion of said drinking bowl to prevent undesirable tilting thereof.

10. The automatic water supply device as defined in claim 7 wherein said biasing means is a coil spring whose terminal end carries a locating ball seated in said recess.

11. The automatic water supply device as defined in claim 10 wherein said drinking bowl has a longitudinal axis, means mounting said valve means in offset relationship to and on one side of said longitudinal axis, and means in offset relationship to and on a second side of said longitudinal axis for limting upward movement of an underlying portion of said drinking bowl to prevent undesirable tilting thereof.

* * * * *